United States Patent [19]

Doré

[11] Patent Number: 4,618,673
[45] Date of Patent: Oct. 21, 1986

[54] SALTS OF THE 1:2 CHROMIUM COMPLEX OF 4-(5'-CHLORO-2'-HYDROXY-3'-SULFO-PHENYLAZO)-3-METHYL-1-PHENYL-PYRAZOL-5-ONE AND 4-(3', 5'-DICHLORO-2'-HYDROXYPHENYLAZO)-3-METHYL-1-PHENYLPYRAZOL-5-ONE

[75] Inventor: Jacky Doré, Basel, Switzerland

[73] Assignee: Sandoz Ltd., Basel, Switzerland

[21] Appl. No.: 304,621

[22] Filed: Sep. 22, 1981

Related U.S. Application Data

[63] Continuation of Ser. No. 880,446, Feb. 23, 1978, abandoned, which is a continuation-in-part of Ser. No. 716,139, Aug. 20, 1976, abandoned.

[30] Foreign Application Priority Data

Aug. 27, 1975 [CH] Switzerland .................. 11099/75

[51] Int. Cl.$^4$ .................. C09B 45/06; C09B 45/16; D06P 1/10
[52] U.S. Cl. .................. 534/698; 534/602; 534/693
[58] Field of Search .................. 260/145 A, 145 B; 534/698

[56] References Cited

U.S. PATENT DOCUMENTS

| | | |
|---|---|---|
| 2,673,201 | 3/1954 | Zickendraht et al. .......... 260/147 |
| 2,806,760 | 9/1957 | Brassel et al. ................ 8/42 |
| 2,906,746 | 9/1959 | Brassel et al. .............. 260/145 |
| 3,005,813 | 10/1961 | Brassel et al. .............. 260/145 |
| 3,041,327 | 6/1962 | Buehler et al. .............. 260/145 |
| 3,062,806 | 11/1962 | Biedermann et al. ........... 260/147 |
| 4,000,965 | 1/1977 | Mennicke et al. ............. 8/26 |
| 4,083,839 | 4/1978 | Back et al. ................. 260/145 |

FOREIGN PATENT DOCUMENTS

| | | | |
|---|---|---|---|
| 638749 | 8/1964 | Belgium .................. | 260/145 B |
| 1151078 | 7/1963 | Fed. Rep. of Germany ... | 260/145 B |
| 1644390 | 9/1971 | Fed. Rep. of Germany ... | 260/145 B |
| 2501039 | 7/1975 | Fed. Rep. of Germany ... | 260/145 B |
| 2500550 | 7/1975 | Fed. Rep. of Germany ... | 260/145 B |
| 2501449 | 7/1975 | Fed. Rep. of Germany ... | 260/145 B |
| 2503441 | 7/1975 | Fed. Rep. of Germany ... | 260/145 B |
| 2504787 | 8/1975 | Fed. Rep. of Germany ... | 260/145 B |
| 2408224 | 10/1975 | Fed. Rep. of Germany ... | 260/145 B |
| 2605191 | 8/1976 | Fed. Rep. of Germany ... | 260/145 B |

*Primary Examiner*—Floyd D. Higel
*Attorney, Agent, or Firm*—Gerald D. Sharkin; Richard E. Vila; Melvyn M. Kassenoff

[57] ABSTRACT

Asymmetric 1:2 chromium complexes of the formula,

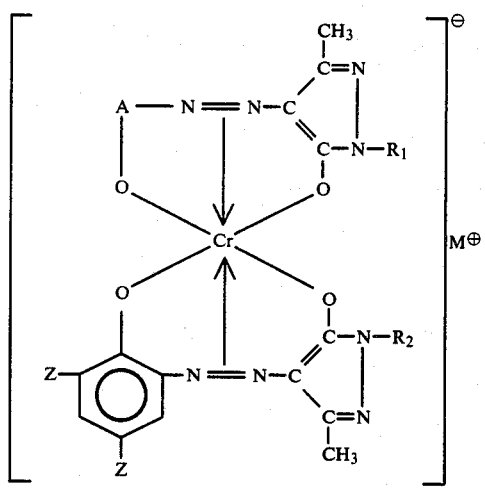

in which A is a group of the formula

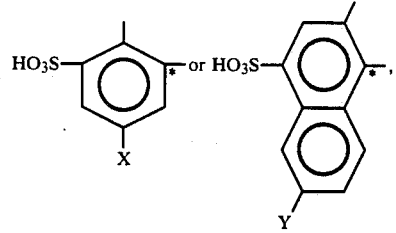

in which
X is halogen, nitro or methyl,
Y is hydrogen or nitro,
* designates the carbon atom bound to the azo group,
each Z is halogen or nitro, both substituents being the same,
each of $R_1$ and $R_2$, independently, is phenyl or phenyl substituted by a total of up to three substituents selected from halogen, $C_{1-6}$alkyl, $C_{1-6}$alkoxy, nitro and cyano (maximum of two nitro and/or cyano), and
$M^\oplus$ is hydrogen or an equivalent of a non-chromophoric cation,
with the proviso that the sulpho group is in salt form, and mixtures of two or more of such 1:2 asymmetric complexes, which complexes and mixtures are useful for dyeing nitrogen-containing organic substrates e.g., natural and synthetic polyamides such as wool, silk and nylon, polyurethanes and leather. The dyes build-up well and the obtained dyeings exhibit notable fastness to light, wet treatments, rubbing, ironing, wool chlorination, acids and alkalis and resistance to carbonization. Some of the dyes are also useful in printing lacquers and ball-point pen inks and for dyeing metals such as anodized aluminum.

2 Claims, No Drawings

SALTS OF THE 1:2 CHROMIUM COMPLEX OF 4-(5'-CHLORO-2'-HYDROXY-3'-SULFO-PHENYLAZO)-3-METHYL-1-PHENYLPYRAZOL-5-ONE AND 4-(3', 5'-DICHLORO-2'-HYDROXYPHENYLAZO)-3-METHYL-1-PHENYLPYRAZOL-5-ONE

This application is a continuation of application Ser. No. 880,446, filed Feb. 23, 1978 and now abandoned, which is a continuation-in-part of application Ser. No. 716,139, filed Aug. 20, 1976 and now abandoned.

The present invention relates to 1:2 chromium complexes and mixtures thereof, their production and use.

More particularly, the present invention provides asymmetric 1:2 chromium complexes of formula I,

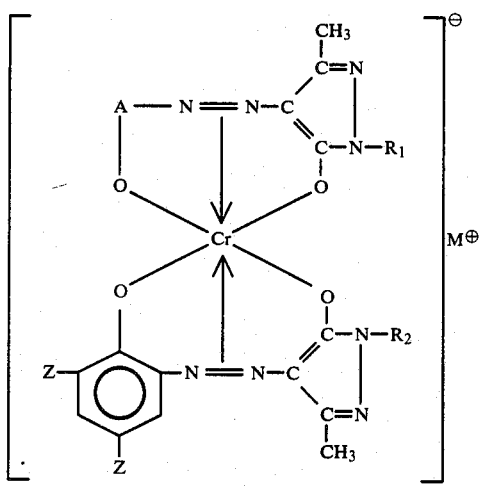

in which
A is a group of formula (a) or (b)

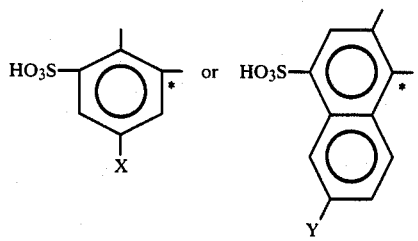

in which
X is halogen, nitro or methyl,
Y is hydrogen or nitro,
* designates the carbon atom bound to the azo group,
each Z is halogen or nitro, both substituents being the same,
each of $R_1$ and $R_2$, independently, is phenyl or phenyl substituted by a total of up to three substituents selected from halogen, $C_{1-6}$ alkyl, $C_{1-6}$ alkoxy, nitro and cyano (maximum of two nitro and/or cyano), and
$M^{\oplus}$ is hydrogen or an equivalent of a nonchromophoric cation,
with the proviso that the sulpho group is in salt form, and mixtures of such asymmetric 1:2 complexes.

By halogen is meant fluorine, chlorine or bromine, preferably chlorine or bromine, with chlorine being especially preferred.

Preferably X is X', where X' is halogen or nitro, more preferably X is X'', where X'' is chlorine or nitro, with chlorine being especially preferred.

Preferably Y is hydrogen.

Preferably each Z is Z', where Z' is chlorine or nitro, more preferably Z is Z'', where Z'' is chlorine.

Any alkyl substituent on the substituted phenyl as $R_1$ and/or $R_2$ is straight chain or branched and preferably contains 1 to 4 carbon atoms, more preferably 1 or 2 carbon atoms, with methyl being especially preferred.

Any alkoxy substituent on the substituted phenyl as $R_1$ and/or $R_2$ preferably contains 1 to 4, more preferably 1 or 2, carbon atoms.

When $R_1$ and/or $R_2$ is a trisubstituted phenyl, such phenyl is preferably substituted by three chlorine atoms, preferably in the 2,4,6-positions.

When $R_1$ and/or $R_2$ is a disubstituted phenyl, the substituents are preferably in the 2,4-, 2,5-, 2,6-, 3,4- or 3,5-positions, with the 2,4-, 2,5- and 3,4-positions being preferred when the two substituents are the same and the 2,5- and 3,4-positions being preferred when the two substituents are different.

When $R_1$ and/or $R_2$ is monosubstituted phenyl any halogen is preferably in the 3- or 4-position, more preferably the 3-position, any alkyl or alkoxy is preferably in the 3- or 4-position, most preferably the 4-position, and any cyano or nitro is preferably in the 3- or 4-position.

Monosubstituted and unsubstituted phenyl radicals are the preferred significances for $R_1$ and $R_2$.

Preferably $R_1$ and $R_2$, respectively, are $R_1'$ and $R_2'$, where each of $R_1'$ and $R_2'$, independently, is a group of formula (c)

in which
$W_1$ is hydrogen, chlorine, methyl, methoxy or ethoxy, and
$W_2$ is hydrogen, chlorine or methyl.

More preferably $R_1$ and $R_2$, respectively, are $R_1''$ and $R_2''$, where each of $R_1''$ and $R_2''$, independently, is a group of formula (c) in which $W_1$ and $W_2$ are $W_1'$ and $W_2'$, where
$W_1'$ is hydrogen, chlorine or methyl, and
$W_2'$ is hydrogen or chlorine.

Even more preferably $R_1$ and $R_2$, respectively, are $R_1'''$ and $R_2'''$, where each of $R_1'''$ and $R_2'''$, independently, is a group of formula (c) in which $W_1$ and $W_2$ are $W_1''$ and $W_2''$, where
$W_1''$ is hydrogen or chlorine, preferably hydrogen, and
$W_2''$ is hydrogen.

Such substituents $W_1$ and $W_2$ are in the preferred positions as given above.

Preferably $M^{\oplus}$ is other than hydrogen and signifies an alkali metal cation, an unsubstituted ammonium ion, a lower alkyl substituted ammonium ion, a hydroxy substituted lower alkyl ammonium ion, a higher alkyl substituted ammonium ion, a monocycloalkyl or dicycloalkyl ammonium ion or a cycloimmonium ion. As examples of alkali metal cations may be given lithium, sodium and potassium. The unsubstituted, lower alkyl substituted and hydroxyalkyl-substituted ammonium cations may be represented by the formula $N^{\oplus}(R)_4$ where each R is, independently, hydrogen, $C_{1-3}$ alkyl or hydroxy($C_{2-4}$alkyl), with the proviso that when one or more of the symbols R signifies hydroxyalkyl at least one R signifies hydrogen, for example, triethylammonium, mono-, di- and tri-ethanolammonium and mono-, di- and tri-isopropanol ammonium.

When $M^{\oplus}$ is a higher, e.g. $C_{5-12}$alkylsubstituted-, monocyclo- or dicyclo- e.g. $C_{5-7}$alkylsubstituted-ammonium ion or a cycloimmonium ion, the water solubility of the complexes is reduced such that they are scarcely water-soluble or only soluble in the presence of organic solvents. Examples of such ions include those derived from N-ethyl-N-hexylamine, cyclohexylamine, N,N-dicyclohexylamine and morpholine.

More preferably $M^{\oplus}$ is an alkali metal cation with sodium being most preferred.

The 1:2 complexes in which $M^{\oplus}$ is hydrogen are, in general, scarcely soluble in water.

The cation of the sulpho group in salt form may be any one of those given above for $M^{\oplus}$ and may be the same as or different from $M^{\oplus}$.

Preferred 1:2 chromium complexes of formula I are those of formula Ia,

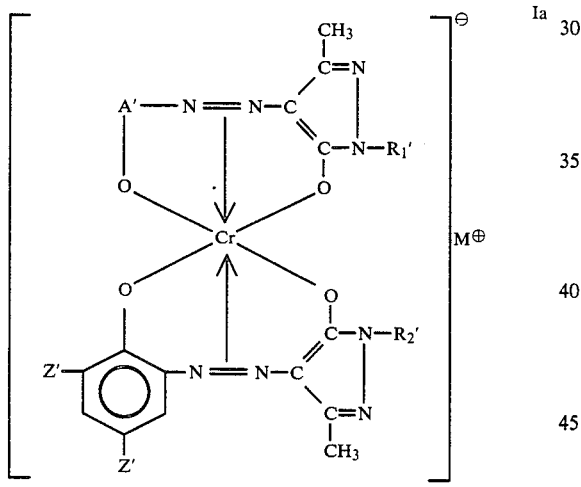

in which either
A' is a radical of formula (a) wherein
X is X", preferably chlorine, or
A' is a radical of formula (b) wherein
Y is hydrogen,
each Z' is as defined above, more preferably
each Z' is Z", where each Z" is as defined above, the two Z"s or Z"'s, as the case may be, being the same, and
$R_1'$, $R_2'$ and $M^{\oplus}$ are as defined above.

Preferred complexes of formula Ia are those where $R_1'$, and $R_2'$ are $R_1''$ and $R_2''$, respectively more preferably $R_1'''$ and $R_2'''$, respectively as defined above, with the compounds where $R_1'$ and $R_2'$ are phenyl being especially preferred.

Further preferred complexes of formula I are those
(i) wherein each Z is each Z" and
  A is a radical of formula (a) in which X is chlorine, or a radical of formula (b) in which Y is hydrogen,
(ii) wherein Z is Z" and
  $R_1$ is $R_1'$, preferably $R_1''$, more preferably $R_1'''$, most preferably phenyl; and
(iii) wherein each Z is each Z", and
  $R_2$ is $R_2'$, preferably $R_2''$, more preferably $R_2'''$, most preferably phenyl.

The invention also provides a process for the preparation of complexes of formula I, or mixtures thereof, comprising
(a) reacting a 1:1 chromium complex of a compound of formula II,

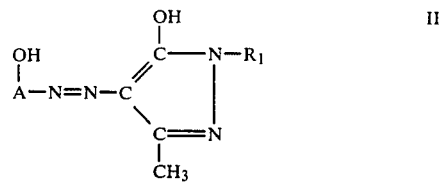

in free acid or salt form,
in which A and $R_1$ are as defined above, or a mixture thereof,
with a metal-free compound of formula III,

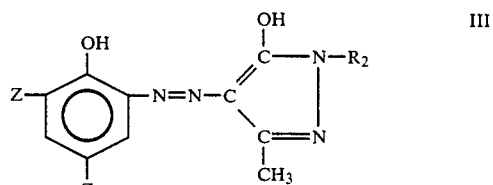

in which Z and $R_2$ are as defined above, or a mixture thereof,
or (b) reacting a 1:1 chromium complex of a compound of formula III, or a mixture thereof, with a metal-free compound of formula II, or a mixture thereof, any sulpho group in free acid form being converted into salt form.

Process (a) is preferred.

The preparation of the 1:1 chromium complexes of the compounds of formula II or III may be carried out in accordance with known methods. The starting materials of formula II and III may be prepared in conventional manner.

The reaction processes (a) and (b) may be carried out in conventional manner. In order to obtain the asymmetric 1:2 chromium complexes it is advantageous to carry out the reaction at a pH in the range of 6 to 11 depending on the salt content of the starting materials, preferably at a pH 7 to 9. It is also advantageous to employ the reactants in approximately stoichiometric amounts avoiding an excess of the metal-free monoazo dyestuff. The product obtained may be isolated in conventional manner, for example by salting out or weakly acidifying followed by washing with salt solution and drying.

Depending on the reaction and isolation conditions (e.g. addition of base to obtain an alkaline pH or the salt used to salt-out the product) a complex of formula I may be obtained in which $M^{\oplus}$ is preferably an alkali metal cation, such as lithium, sodium or potassium, or an ammonium ion and in which the salt form of the sulpho group is the same as or different from $M^{\oplus}$. When a weak acid is used a complex is obtained in which $M^{\oplus}$ is hydrogen and the sulpho group is in salt form. The hydrogen ion may be replaced by an alkali metal cation or quaternary ammonium ion by the addition of alkali metal hydroxides or organic amines. It will be appreciated that the cation of the sulpho group may also be replaced at the same time.

The mixtures of the asymmetric 1:2 chromium complexes of formula I may also be obtained by mere admixture of different asymmetric 1:2 chromium complexes of formula I.

The complexes of formula I and mixtures thereof are useful for dyeing and printing nitrogen-containing organic substrates. Examples of suitable substrates are those which consist of or comprise natural or synthetic polyamides such as wool, silk, or nylon, or polyurethane leather.

The complexes of formula I and mixtures thereof are suitable for dyeing from a weakly alkaline, neutral or weakly acidic for example, an acetic acid-containing, dyebath.

The dyeings obtained exhibit notable fastness to light, wet, rubbing, alkaline milling, alkaline sweat, washing and potting and resistance to carbonization, ironing, wool chlorination and action of acids and alkalis.

The dyestuffs build-up from a neutral medium on polyamide fibres, the build-up being tone-in tone due to their pure asymmetric character. The dyestuffs also build-up equally on wool and nylon when dyed together. The dyestuffs are suitable for use in combination with other 1:2 metal complexes. The complexes may be formed into stable printing pastes which build-up well on all types of polyamides.

The complexes of formula I and mixtures thereof are also useful for spin-dyeing synthetic polyamides and silk acetate in the mass.

The complexes of formula I which are well soluble in water, i.e., those in which $M^\oplus$ is other than hydrogen, a higher alkylammonium ion, a mono- or dicycloalkylammonium ion or cycloimmonium ion are also useful for dyeing metals, especially anodized aluminium.

The complexes of formula I in which $M^\oplus$ is a higher alkylammonium ion, a mono- or dicycloalkylammonium ion or cycloimmonium ion may also be used in the preparation of printing lacquers and ball-point pen inks.

The dyes according to the invention may be employed as such or in the form of liquid or solid preparations.

Preferably water-soluble organic solvents, optionally mixed with water, are used for the liquid preparations which are in the form of stable concentrated stock solutions; conventional additives such as dissolving agents (e.g., urea or alkali reacting organic or inorganic substances) may be added thereto. The stock solutions may be diluted with water. Such preparations may be made, for example, in accordance with the procedure described in German Pat. No. 1,619,470 or in German Patent Application No. 2,033,989. Also concentrated stable aqueous preparations which contain conventional additives may be used.

Solid preparations which are in powder or granulate form with an average particle size of at least 20μ can be used, which preparations contain conventional additives such as standardization agents. Such solid preparations may be made, for example, in accordance with the procedure described in British Pat. No. 1,370,845. The solid preparations are well soluble in water.

The following Examples further serve to illustrate the invention. In the Examples the temperatures are in degrees Centigrade and the parts are by weight.

EXAMPLE 1

The 1:1 chromium complex which is obtained from 24.5 parts of the azo dyestuff obtained by reacting diazotised 2-amino-4-chloro-1-hydroxybenzene-6-sulphonic acid and 1-phenyl-3-methyl-5-pyrazolone is stirred in 400 parts of water at 80° together with 21 parts of the monoazo dyestuff obtained from diazotised 2-amino-4,6-dichloro-1-hydroxybenzene and 1-phenyl-3-methyl-5-pyrazolone. The suspension is set at a pH of 7.5–8.5 by adding a 20% sodium carbonate solution and is subsequently stirred at 80°–85° until the two monoazo dyestuffs are no longer detectable. The uniform chrome-like complex, which is partially in solution, is precipitated by adding sodium chloride, isolated by filtration and vacuum dried after washing in a 5% sodium chloride solution. The dyestuff obtained, which after grinding is in the form of a dark-red powder and is well soluble in water, corresponds to formula I wherein A is the radical of the formula

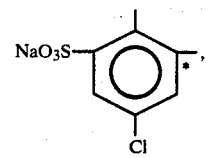

each Z is chlorine, $R_1$ and $R_2$ are phenyl and $M^\oplus$ $Na^\oplus$. It dyes wool and synthetic polyamides in red shades, and the dyestuff builds-up well tone-in-tone from a neutral bath. The dyeings have very good all-round fastness properties.

EXAMPLE 2

The 1:1 chromium complex which is obtained from 42.4 parts of the azo dye of diazotised 1-amino-2-naphthol-4-sulphonic acid and 1-phenyl-3-methyl-5-pyrazolone is stirred in 1000 parts of water at 80° together with 38.5 parts of the monoazo dyestuff obtained from diazotised 2-amino-4,6-dichloro-1-hydroxybenzene and 1-(3'-chlorophenyl)-3-methyl-5-pyrazolone. The reaction is continued in accordance with the procedure described in Example 1. The dyestuff obtained corresponds to formula I wherein A is the radical of the formula

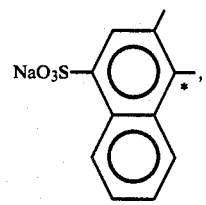

each Z is chlorine, $R_1$ is phenyl, $R_2$ is

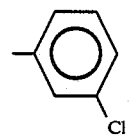

and $M^\oplus = Na^\oplus$. It dyes wool and synthetic polyamides in bluish-red shades and builds-up well, tone-in-tone, from a neutral bath. The dyeings obtained have good all-round fastness properties.

In accordance with Examples 1 and 2, further 1:2 chromium complexes may be obtained by reacting the 1:1 chromium complex of a compound of the formula

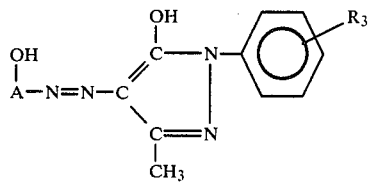

with a compound of the formula

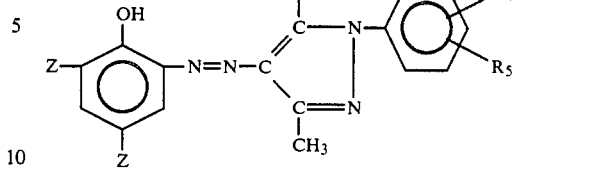

The significances of A, $R_3$, $R_4$, $R_5$ and Z as well as the dye-shade on polyamide are given in the following Table; the cation of the sulpho group is, in each case, sodium.

| Example No. | 1:1 chromium complex of a compound of formula IIa | | Metal-free monoazo dye of formula IIIa | | | Dye-shade on polyamide |
|---|---|---|---|---|---|---|
| | A | $R_3$ | Z | $R_4$ | $R_5$ | |
| 3 | HO$_3$S—⌬—Cl (with * marker) | H | Cl | Cl (3) | H | red |
| 4 | " | H | NO$_2$ | H | H | orange-scarlet |
| 5 | " | Cl (3) | Cl | Cl (3) | H | bluish-red |
| 6 | " | Cl (3) | Cl | H | H | " |
| 7 | " | H | Cl | CN (3) | H | " |
| 8 | " | Cl (3) | NO$_2$ | Cl (3) | H | scarlet |
| 9 | " | Cl (2) | NO$_2$ | Cl (4) | H | " |
| 10 | " | H | Cl | Cl (2) | Cl (5) | red |
| 11 | " | H | Cl | Cl (3) | Cl (4) | " |
| 12 | " | Cl (4) | Cl | H | H | " |
| 13 | " | H | Cl | CH$_3$ (4) | H | " |
| 14 | " | H | Cl | Cl (2) | CH$_3$ (4) | " |
| 15 | " | H | Cl | CH$_3$ (3) | CH$_3$ (5) | " |
| 16 | " | OCH$_3$ (4) | Cl | H | H | " |
| 17 | HO$_3$S—⌬—NO$_2$ | H | Cl | H | H | orange |
| 18 | " | H | Cl | Cl (3) | H | " |
| 19 | " | H | NO$_2$ | Cl (2) | Cl (5) | " |
| 20 | " | H | Cl | C$_2$H$_5$ (2) | H | " |
| 21 | " | Cl (3) | NO$_2$ | H | H | " |
| 22 | " | C$_2$H$_5$ (2) | Cl | H | H | " |
| 23 | " | H | Cl | Cl (4) | H | scarlet |
| 24 | " | H | Cl | Cl (3) | Cl (4) | " |
| 25 | " | Cl (4) | Cl | Cl (3) | H | " |
| 26 | " | CH$_3$ (4) | Cl | Cl (4) | H | " |
| 27 | HO$_3$S—naphthyl | H | Cl | H | H | bluish-red |
| 28 | " | Cl (4) | Cl | H | H | " |
| 29 | " | H | Cl | Cl (3) | Cl (4) | " |
| 30 | " | H | Cl | C$_2$H$_5$ (2) | H | " |
| 31 | " | Cl (3) | Cl | Cl (3) | H | bordeaux |
| 32 | " | H | NO$_2$ | H | H | red |
| 33 | " | H | NO$_2$ | Cl (3) | H | " |
| 34 | " | Cl (3) | NO$_2$ | Cl (3) | H | " |

-continued

| Example No. | 1:1 chromium complex of a compound of formula IIa | | Metal-free monoazo dye of formula IIIa | | | Dye-shade on polyamide |
|---|---|---|---|---|---|---|
| | A | $R_3$ | Z | $R_4$ | $R_5$ | |
| 35 | " | H | $NO_2$ | Cl (4) | H | " |
| 36 | " | Cl (3) | Cl | H | H | bluish-red |
| 37 | 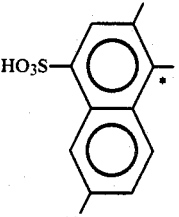 | H | Cl | H | H | brown-red |
| 38 | " | H | Cl | Cl (3) | H | " |
| 39 | " | Cl (3) | Cl | Cl (3) | H | " |

The dyestuffs of Examples 1 to 39 may also be prepared by reacting the 1:1 chromium complex of a monoazo dyestuff of formula III with a metal-free monoazo dyestuff of formula II.

APPLICATION EXAMPLE A 0.1 g of the dyestuff of Example 1 or 2 are dissolved in 300 parts of water, and 0.2 g of ammonium sulphate are added. Subsequently, the moistened material (5 g of wool gabardine or 5 g nylon-satin) is entered into the bath and the bath is heated over the course of 30 minutes to boiling temperature. The water which evaporated during the 30 minutes boiling is replaced and dyeing is completed during the next 30 minutes at the boil. The dyed material is subsequently rinsed. After drying, a red (Example 1) or bluish-red (Example 2) dyeing having good light- and wet-fastness properties is obtained.

Dyeings may be made in accordance with the above procedure employing any one of the dyestuffs of Examples 3 to 39 or a mixture of any two or more of the dyestuffs of Examples 1 to 39.

APPLICATION EXAMPLE B

Polyamide is printed with a printing paste containing:
30 parts dyestuff of Example 1 or Example 27,
50 parts urea,
50 parts dissolving agent, for example thiodiethylene glycol,
300 parts water,
500 parts suitable thickening agent, for example based on locust bean gum,
60 parts acid acceptor, for example, ammonium tartrate, and
60 parts thiourea.

The printed goods are steamed for 40 minutes at 102° C. (saturated steam), then rinsed with cold water, washed for 5 minutes at 60° C. with a dilute solution of a conventional detergent and then rinsed again. A red (Example 1) or bluish red (Example 27) print having good wet- and light-fastness is obtained.

In analogous manner printing pastes may be prepared using any one of the dyestuffs of Examples 2 to 26 or 28 to 39.

What is claimed is:

1. A complex of the formula

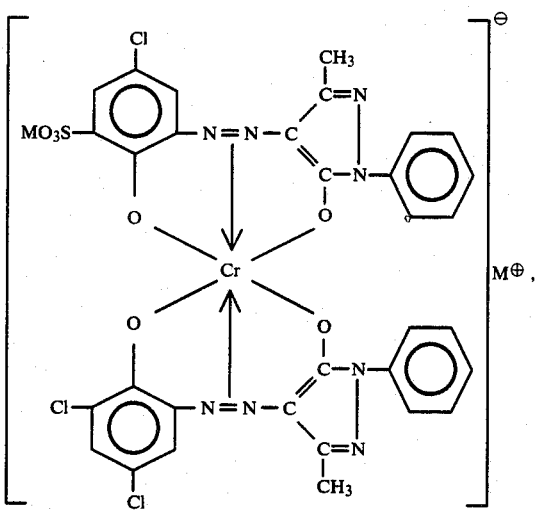

wherein
$M^\oplus$ is hydrogen or a non-chromophoric cation, and
M is a non-chromophoric cation.

2. The complex according to claim 1 wherein
$M^\oplus$ is sodium, and
M is sodium.

* * * * *